United States Patent
Hill

(10) Patent No.: US 6,735,038 B2
(45) Date of Patent: May 11, 2004

(54) SUPPLY VARIANCE COMPENSATION METHOD FOR SWITCHED VOLTAGE MODE VOICE COIL MOTOR DRIVER CIRCUIT

(75) Inventor: John P. Hill, Nederland, CO (US)

(73) Assignee: STMicroelectronics, Inc., Carrollton, TX (US)

( * ) Notice: Subject to any disclaimer, the term of this patent is extended or adjusted under 35 U.S.C. 154(b) by 346 days.

(21) Appl. No.: 09/877,278

(22) Filed: Jun. 8, 2001

(65) Prior Publication Data

US 2002/0186491 A1 Dec. 12, 2002

(51) Int. Cl.[7] ............................................. G11B 21/02
(52) U.S. Cl. ..................................... 360/75; 318/560
(58) Field of Search .......................... 360/75, 32, 69, 360/97.02, 77.02, 78.04, 77.04, 78.09, 77.08, 78.14, 73.03; 318/560, 254, 432, 479; 363/98, 131; 324/210, 212, 226

(56) References Cited

U.S. PATENT DOCUMENTS 5,325,247 A * 6/1994 Ehrlich .................... 360/78.09
5,917,720 A    6/1999 Galbiati
6,617,817 B2 * 9/2003 Hill ............................ 318/560

OTHER PUBLICATIONS

Carlo Vertemara, "12V Disk Drive Power Combo IC," Application Note, May 1999.
Stmicroelectronics, "Mozart, 12 v. Disk Drive Spindle & VCM, Power & Control Combo," Sep. 1999.
Carlo Vertemara, "L6254–L6268–L6269 Application Note," Apr. 12, 1999.
Stmicroelectronics, "L7250 IC Design Specification Preliminary," Sep. 14, 2000.

* cited by examiner

Primary Examiner—Alan T. Faber
(74) Attorney, Agent, or Firm—Lisa K. Jorgenson; William J. Kubida

(57) ABSTRACT

A VCM power driver having an input for receiving an external supply voltage VDD. A voltage-mode driver is coupled to the power supply voltage and generates a drive signal to a load. A system processor generates commands indicating a programmed voltage output desired from the voltage-mode driver. A comparator compares VDD to a reference voltage to generate an error signal. A combination mechanism generates a modified command using the error signal. The modified commands are coupled to the voltage-mode driver, such that the voltage-mode driver generates a voltage output based upon the modified command.

21 Claims, 3 Drawing Sheets

SUPPLY VARIANCE COMPENSATION METHOD FOR SWITCHED VOLTAGE MODE VOICE COIL MOTOR DRIVER CIRCUIT

BACKGROUND OF THE INVENTION

1. Field of the Invention

The present invention relates, in general, to driver circuits, and, more particularly, to systems and methods for compensating for supply voltage variations to a switched voltage-mode VCM (Voice Coil Motor) power drivers in which an important system variable is controlling the current level in the load.

2. Relevant Background

Switched power driver circuits are widely used to generate power suitable for driving loads such as motors. Switched power drivers turn on and off repetitively to supply regulated current in an efficient manner (i.e., with minimal switching loss). Switched power driver circuits are associated with driver circuits that control, for example, the magnitude by means of the duty cycle of the on and off cycles so as to supply a desired amount of power to a load. In a typical application, a power driver circuit is controlled by a VCM system processor, often implemented as a microcontroller IC, that generates commands to the driver circuit. The driver circuit essentially turns on and off in response to the received commands. When on, the driver circuit supplies current to the load, and when off, the driver circuit cuts off current supply to the load.

VCM loads are permanent magnet motors, making their behavior (e.g., speed and direction) related to the magnitude and polarity of the current supplied. For precision motor control applications such as required in disk drive storage systems, unexpected variation in this magnitude can lead to positioning errors and slower performance. For example, the typical application involves control of a voice coil motor (VCM) that controls position of a head assembly with respect to a disk surface in a hard disk drive. Transient variations in the load current translate into position errors. The disk drive system must compensate for the errors by waiting for the transient condition to subside before writing or reading data from the desired location.

In the case of the driver for a VCM in a disk drive, a typical circuit topology is one that is termed a "Current Minor Loop" (CML). This refers to a feedback circuit that generates a signal that is proportional to or indicative of the current magnitude in the load. The "minor" loop refers to localized feedback in the driver circuit in contrast to the "major" loop that controls the head position. The current in the load is sensed by an external current sense resistor, for example, that is coupled in series with the load. This resistor is typically a high precision power resistor that is relatively expensive.

The voltage across the resistor is brought into a control IC through an additional pin. This sense voltage is amplified by a special, high CMRR (Common Mode Rejection Ratio) amplifier. This amplifier can be expensive in terms of development costs and added die area. The control IC executes commands that specify a voltage value corresponding to a desired current level. The measured current sense voltage is compared to the requested current command value and a corrected command value is applied to the power drivers to obtain a load current that is proportional to command value. This extra IC pin required to port in the resistor voltage is not desirable in highly integrated circuits due to an increase in package cost. Moreover, the extra IC pin displaces other functionality that could be implemented using the pin. The current sense amplifier also adds cost. When the supply voltage (i.e., the voltage supplied to the voltage-mode driver circuit) varies, the action of the feedback loop eventually maintains the proper current in the load. As higher levels of circuit integration are desired and the reduction of external components and pins is desirable due to cost and circuit area constraints, the CML topology is undesirable.

One method of creating a topology that eliminates the need for the external current sense resistor, additional pin, and current sense amplifier, is a voltage-mode driver. Voltage mode power drivers refer to a class of control circuits that regulate the output voltage as opposed to output current. Voltage mode drivers are desirable because they require fewer device I/O pins to monitor and regulate the supplied power. A switched voltage-mode VCM power driver would not sense the current in the load and therefore would have no means to correct for supply variation. This supply variation in a switched voltage mode drive directly affects the average voltage to the load.

While voltage and current in an inductive load are related, a voltage-mode driver regulates current in the inductive load indirectly by regulating the applied voltage. In this case, the average voltage output of the driver is proportional to the command value. When the mode of operation of the driver is linear or continuous, the output average voltage value can be sensed and used to correct for the variation of supply voltage in a feedback method similar to the CML, but without the external current sense resistor and extra pin.

Another alternative is to use a switched mode driver technique. Switched mode drivers are also known as pulse width modulation (PWM), phase shift modulation (PSM) and other names. Switched-mode drivers can be implemented as current-mode (i.e., use the current minor loop) or as voltage-mode drivers. These switched mode drivers have the advantage of reducing the power dissipation to the driver devices and therefore allow smaller devices and packages.

In a VCM driver that is switched mode and voltage mode the resulting output current to the load is directly proportional to the supply voltage. For example, for a fixed input command, the resulting load current when the supply voltage has dropped 10% is also 10% lower than the current would be at nominal VDD levels. It is desirable to correct for this variation in supply voltage level since this affects the gain and bandwidth in the servo loops. This affects the performance (e.g., tracking accuracy and settling time) of the device in which the driver is being used. The command to the power driver is updated at a rate that is matched to the feedback information rate of the system. In a disk drive this is the servo sector rate. This rate is too slow to effectively correct for supply variation between servo sectors. It is preferable that the driver correct for power supply variations at a much faster rate.

SUMMARY OF THE INVENTION

Briefly stated, the present invention involves a power driver having an input for receiving an external supply voltage VDD. A voltage-mode driver is coupled to the power supply voltage and generates a drive signal to a load. A system processor generates commands indicating a programmed voltage output desired from the voltage-mode driver. A comparator (or difference calculation method) compares VDD to a reference voltage to generate an error signal. A combination mechanism generates a modified command using the error signal. The modified commands are coupled to the voltage-mode driver, such that the voltage-mode driver generates a voltage output based upon the modified command.

In another aspect, the present invention involves a method of driving a VCM load. A power supply provides a voltage VDD. A voltage-mode driver is coupled to this power supply and generating a drive signal to a load. Commands indicating a programmed voltage output desired from the voltage-mode driver are generated. VDD is compared to a reference voltage to generate an error signal. The commands are modified using the error signal to produce a modified command and supplied to the voltage-mode driver. The voltage output is generated from the voltage-mode driver based upon the modified command.

DETAILED DESCRIPTION OF THE PREFERRED EMBODIMENTS

The present invention involves a control system and methodology in which the level of the VDD (supply voltage) is compared to a reference and the resulting error is used to correct the command from the system processor before it is applied to the power drivers in a feed forward fashion. This correction can be made at a rate much higher than the input command update rate. Hence, changes in VDD levels between commands can be corrected more quickly. The present invention is described in terms of disk drive electronics and in particular to switched, voltage-mode VCM drivers.

Figure 1:
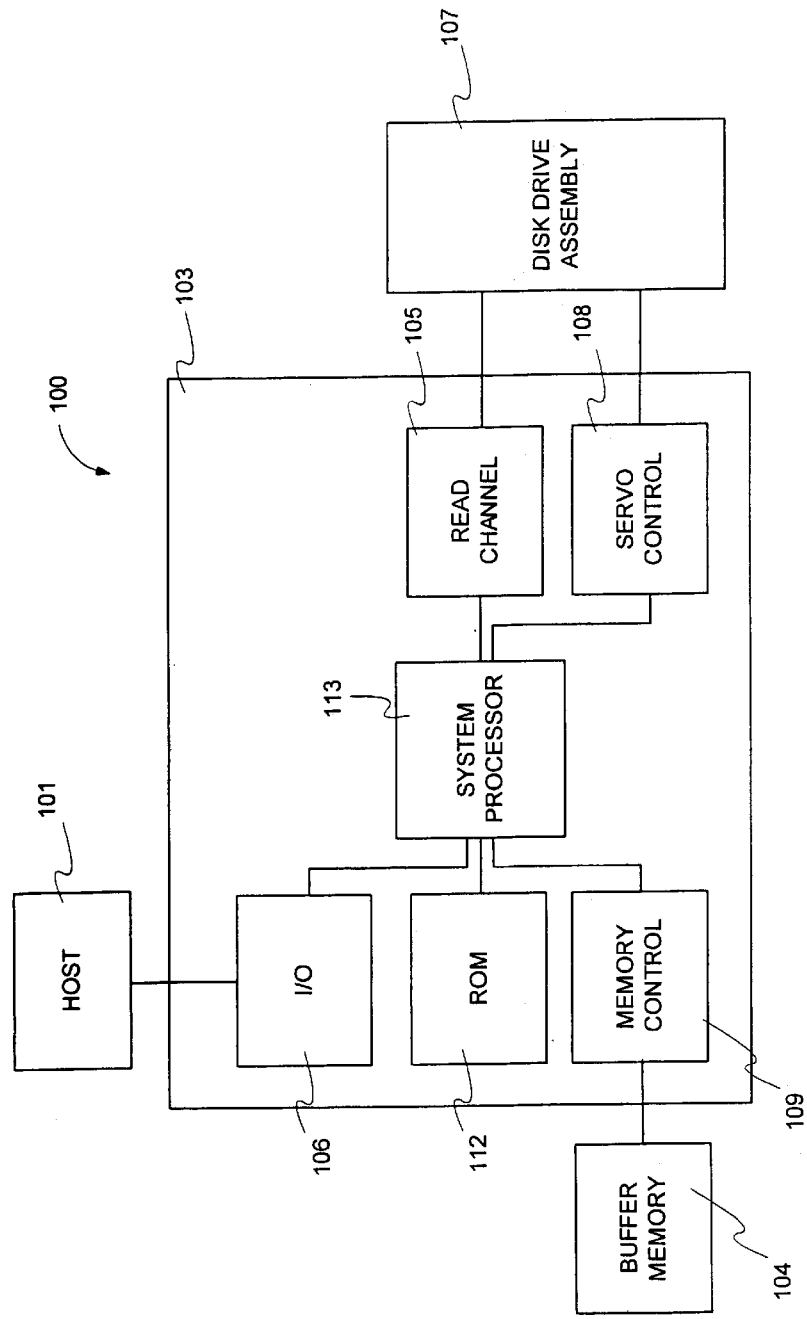
FIG. 1 shows in block diagram form a disk drive control system in which the present invention is implemented.

FIG. 1 illustrates in simplified form a drive system 100 in which the present invention is embodied. Disk drive system 100 includes a system processor 113 that processes requests and commands from a host computer 101 that direct drive system to perform specific behavior involving disk drive assembly 107. Examples include reading and writing data to disk drive assembly 107, providing state information such as defect tables, error status, and the like. Disk controller unit 103 includes data processing capacity as well as memory in the form of ROM 112 and buffer memory 104 to generate responses to received commands and requests. The generated responses return data, state information, and/or error codes depending on the particular operation being performed.

Disk drive assembly 107 implements physical mass storage typically on a plurality of magnetic disks and read/write head electronics for transferring data with the disks. Disk drive assembly 107 typically includes read channel hardware for preprocessing and amplifying data read from the magnetic media as well as a spin motor for spinning the disks, and voice coil motor (VCM) for positioning the read/write head electronics at specific locations with respect to the disk surface(s).

Servo control 108 generates drive signals that control the VCM and/or spin motors. These drive signals are in the form of precision higher power signals that drive the motors directly. In accordance with the present invention, servo control 108 includes a voltage-mode driver and supplies the drive signals using a power drive circuit such as an H-bridge transistor configuration. The present invention provides a system and method that avoid use of a precision current measurement resistor in a current minor loop, therefore eliminating one connection between servo control 108 and disk drive assembly 107, the sense resistor, and the current sense amplifier.

Host 101 typically comprises a data processing device such as a personal computer, server, workstation or the like that requires access to bulk data storage capabilities of disk drive assembly 107. Host 101 sends write commands and data via controller 103 to write data onto the disks as well as read commands to retrieve previously written data from disks within disk drive assembly 107. On both read and write operations the data transmitted from the host 101 to the disk controller 103 includes an indication of a specific location or set of locations on the disk drive assembly that contains the data that is to be accessed.

The data that is exchanged through disk controller 103 is typically buffered in buffer memory 104 that is accessible via memory controller 109 and subsequently transmitted to disk assembly 107 or host 101. Buffer memory 104 is used to overcome differences between the speed at which host 101 operates as compared to the speed at which disk assembly 107 operates. In place of or in addition to buffer memory 104, a cache memory may be implemented by appropriate changes (e.g., tag management, hit/miss detection, and the like) to memory controller 109.

Figure 2:
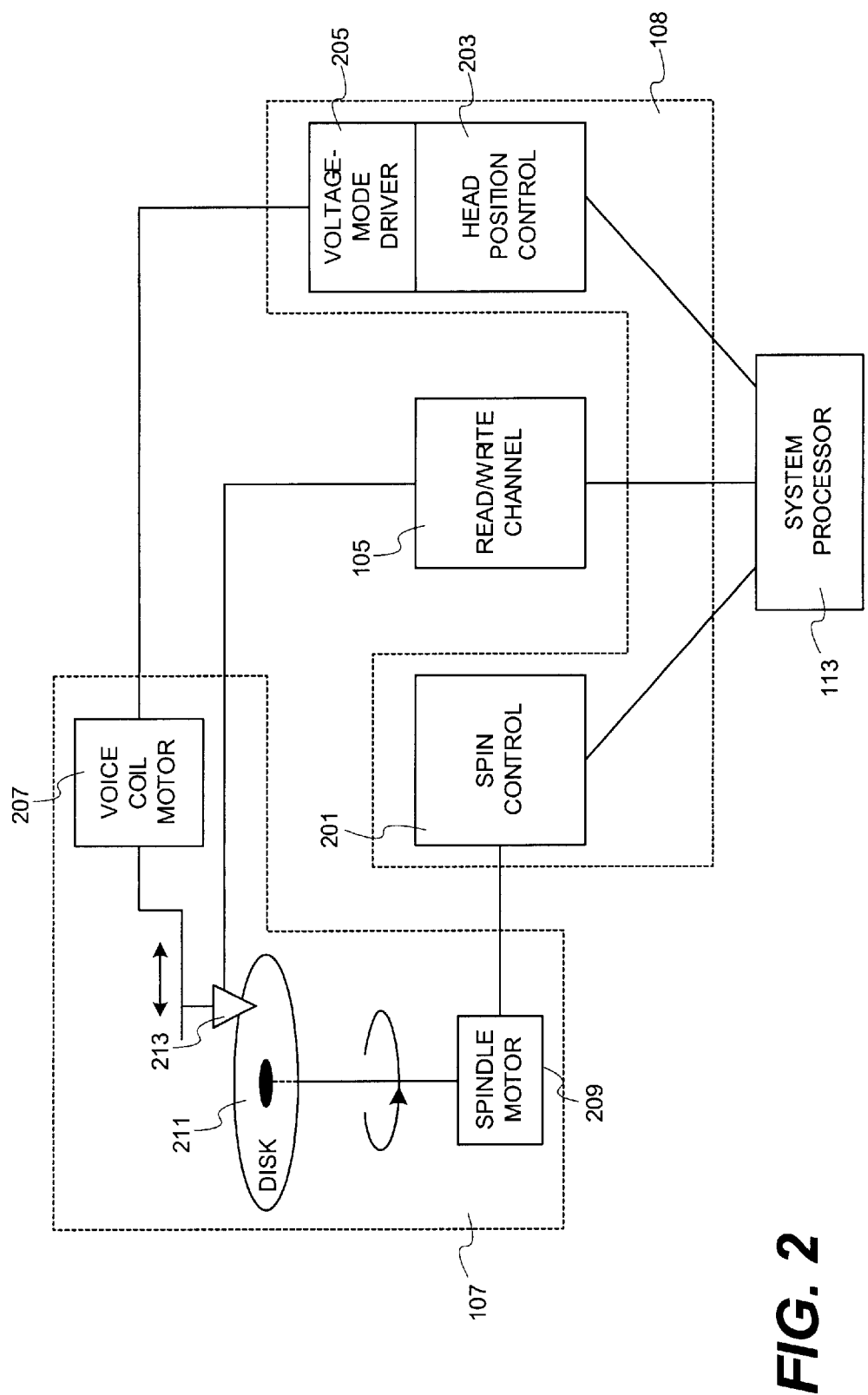
FIG. 2 shows a more detailed view of some of the components shown in FIG. 1.

FIG. 2 illustrates some of the components of FIG. 1 in greater detail. As shown in FIG. 2, servo control 108 includes spin control unit 201 that regulates the spin speed of spindle motor 209 in response to commands from system processor 113. Head position control unit 203 operates through voltage mode driver unit 205 to deliver controlled voltage signals in response to commands from system processor 113 to voice coil motor 207. These voltage signals cause voice coil motor unit 207 to move read/write head 213 into precision alignment with respect to the surfaces of disk 211. The voltage controlled driver configuration of the present invention is particularly applied to voice coil motor 207.

Read channel circuit 105 communicates data and control information with the surface of disk 211. Control information such as servo control data, phase lock oscillator synchronization patterns, and servo bursts are encoded into portions of disk 211. This information is provided through read channel circuit 105 to system processor 113. System processor 113 uses this information to compute commands for spin control unit 201 and head position control unit 203. The logic components shown in FIG. 2 are driven by a supply voltage VDD (not shown). As VDD varies, the computed commands will not result in ideal reactions, hence, the computed commands are modified by head position control unit 203 and/or voltage mode driver 205 so as to compensate for variations in supply voltage VDD.

Figure 3:
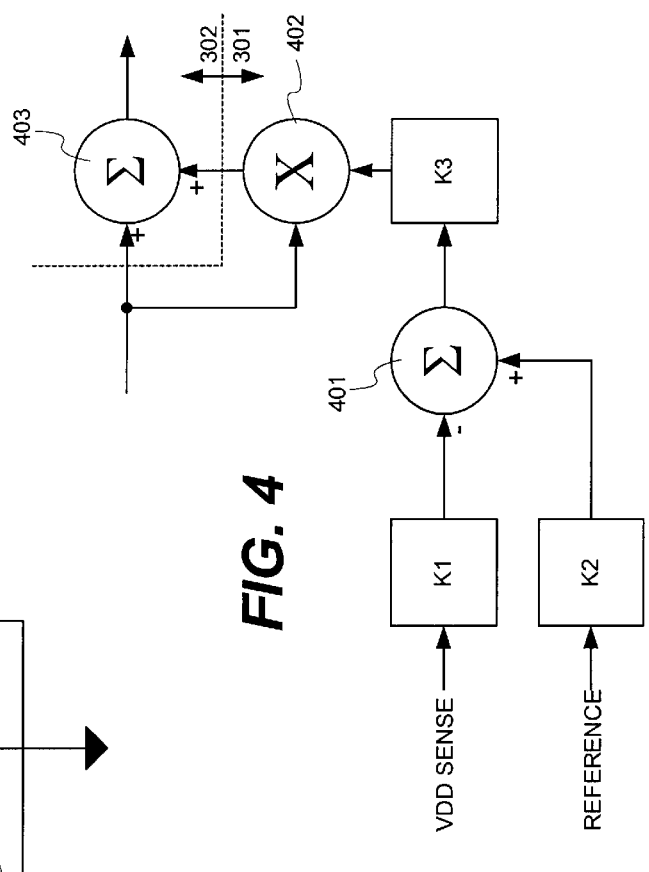
FIG. 3 illustrates in block diagram form components of a voltage mode driver circuit in accordance with the present invention.

FIG. 3 illustrates details of an exemplary voltage mode driver circuit 205 in accordance with an embodiment of the present invention. Pulse width modulation/phase shift modulation (PWM/PSM) generator 302 outputs, for example, four control signals where each signal controls the on/off state of one of switches "A", "B", "C", and "D" in power driver 303. Absent the VDD correction mechanisms of the present invention, PWM/PSM generator 302 generates the control signals based upon the value of the command received from system processor 113. Power driver 303 is configured as an "H-bridge" driver circuit in the particular example, although other power driver configurations may be appropriate in some applications. Driver circuit 303 outputs a drive signal that provides an average voltage to drive the load.

In essence, voltage mode driver 205 functions to compare a VDD sense signal indicating a measured level of VDD (supply voltage) to a reference voltage and compute an error value and correction value using VDD correction unit 301. The computed correction value is supplied to PWM/PSM generator 302 and used to correct the command from the system processor 113 before it is applied to the power drivers 303 in a feed forward method. This correction can be made at a rate much higher than the input command update rate so changes in VDD levels between commands can be corrected.

Figure 4:
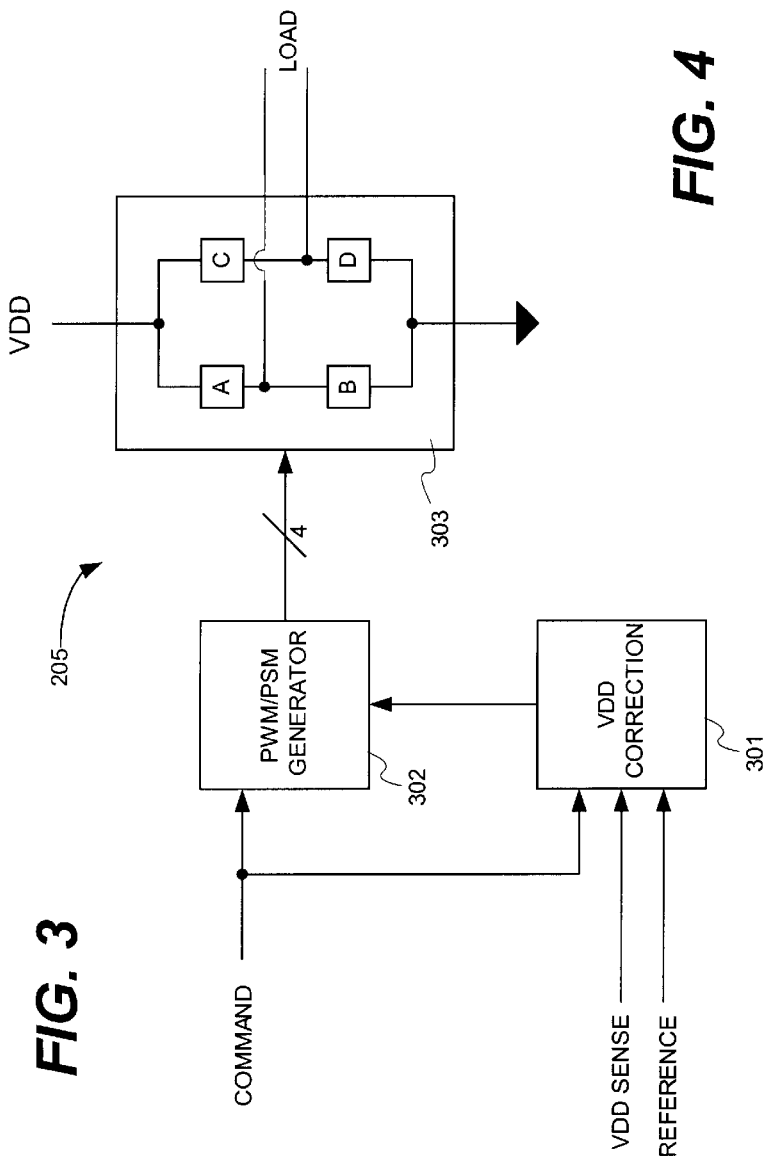
FIG. 4 shows components of a voltage mode driver circuit shown in FIG. 3 in greater detail.

In practice, a percentage of the VDD voltage is compared to a reference by VDD correction unit 301 such that the resulting error value is zero when the VDD is nominal and is of the correct sign (positive or negative) to correct the command when the supply is higher or lower than nominal. A variety of circuits for appropriately scaling the VDD sense signal input to VDD correction unit 301 are available. In FIG. 4, the scaling block labeled K1 scales the VDD sense signal while the scaling block labeled K2 scales the reference voltage signal to appropriate levels selected to meet the needs of a particular application. Comparator 401 generates an output that is proportional to the difference between the (scaled) VDD sense signal and the (scaled) reference voltage. Similarly, the compared value output from comparator 401 in FIG. 4 may be scaled by, for example, a scaling block labeled K3 in FIG. 4.

As shown in FIG. 4, the command value is multiplied by this error value in multiplier 402 to scale the correction value to a correct value for the applied command. The correction value is added to the command in the PSM/PWM generator by adder 403. As suggested in FIG. 4, adder 403 is implemented in PWM/PSM generator 302 whereas the other components in FIG. 4 are implemented in VDD correction unit 303 in the particular example. This block generates switching drive signals to the power drivers. The sequence of the switching signals depends on the type of switch mode waveforms desired (i.e., PWM or PSM or other). For the disk drive example, the PSM algorithm is assumed The switching sequence applies the VDD and ground to the terminals of the load such that the average value of the voltage is proportional to the command value plus the correction as well as the VDD level. With this method the correction value cancels out the VDD variation and the average value of the voltage is proportional to the command value. The load current is proportional to average voltage if the resistance of the load is constant. This will be assumed for purposes of this explanation as unit-to-unit variation in resistance can be calibrated out in the disk drive example.

The functions in the PSM /PWM generator block 302 and the VDD corrector block 301 can be implemented in analog, digital, or firmware/processor. One of the advantages of the method in accordance with the present invention is that no division of variables is required. For example, when the final multiply and sum (accumulate) is done by a dedicated MAC (multiply and accumulate) engine, then this is done typically in one instruction. A division would require a more lengthy sequence of operations. The calculation of the VDD error level can be done in the analog domain and then converted to a digital representation by an A/D converter, in the "K3" block, or in a configuration that generates a digital word for the MAC engine, such as an A/D converter that is biased and scaled to provide the percentage difference of VDD from its nominal value. The implementation method does not affect the essence of the present invention but these examples are given to clarify the method.

In preferred implementations, servo control circuit 108 is implemented in an integrated circuit having a set of one or more pins dedicated to providing a drive signal to voice coil motor 207. The IC will require a VDD pin, and by regulating the output of the drive signal using the already-dedicated VDD pin, extra pins necessary to implement current minor loop regulation are eliminated. The "VDD sense" node, in FIG. 3 and FIG. 4 is the same VDD applied to the drivers 303 in FIG. 3.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method of driving a VCM load comprising:
   providing a power supply generating a voltage VDD;
   providing a voltage-mode driver coupled to the power supply (VDD) and generating a drive signal to a load;
   generating commands indicating a programmed voltage output desired from the voltage-mode driver;
   comparing VDD to a reference voltage to generate an error signal;
   modifying the commands using the error signal to produce a modified command;
   supplying the modified commands to the voltage-mode driver; and
   generating a voltage output from the voltage-mode driver based upon the modified command.

2. The method of claim 1 wherein the error signal cancels out VDD variation from a nominal VDD value such that an average value of the voltage output is proportional to the values indicated by the commands.

3. The method of claim 1 wherein the power driver comprises an H-bridge.

4. The method of claim 1 wherein the act of generating a voltage comprises generating a pulse width modulated output wherein the duty cycle is responsive to the modified command.

5. The method of claim 1 wherein the act of generating a voltage comprises generating a phase shift modulated output wherein the duty cycle is responsive to the modified command.

6. The method of claim 1 wherein the act of generating commands comprises generating a command value indicating a programmed voltage desired as the voltage output.

7. The method of claim 6 wherein the act of modifying the commands comprises combining the command value with the error signal.

8. The method of claim 1 further comprising:
   determining a difference between the nominal VDD value and an actual VDD value to generate the error signal;
   scaling the error signal such that the scaled error signal indicates a percentage variation between the nominal VDD value and the actual VDD value; and
   multiplying the command by the scaled error signal to determine the modified command.

9. The method of claim 8 wherein the act of multiplying is performed in a single multiply and accumulate operation.

10. The method of claim 8 wherein the act of modifying the command is performed without a division of variables operation.

11. A power driver comprising:

an input for receiving an external supply voltage VDD;

a voltage-mode driver coupled to the power supply voltage and generating a drive signal to a load;

a system processor configured to generate commands indicating a programmed voltage output desired from the voltage-mode driver;

a comparator coupled to compare VDD to a reference voltage to generate an error signal;

a combination mechanism coupled to receive the error signal and the command and generate a modified command using the error signal;

a connection coupling the modified commands to the voltage-mode driver, wherein the voltage-mode driver generates a voltage output based upon the modified command.

12. The system of claim 11 wherein the error signal cancels out VDD variation from a nominal VDD value such that an average value of the voltage output is proportional to the values indicated by the commands.

13. The system of claim 11 wherein the power driver comprises an H-bridge and the modified commands control activation state of switches within the H-bridge.

14. The system of claim 11 wherein the voltage mode driver comprises a pulse width modulation controller, wherein the duty cycle is responsive to the modified command.

15. The system of claim 11 wherein the voltage-mode driver comprises a phase shift modulation controller, wherein the duty cycle is responsive to the modified command.

16. The system of claim 11 wherein the command comprises generating a command value indicating a programmed voltage desired as the voltage output.

17. The system of claim 11 further comprising:

at least one scaling unit coupled to receive the error signal and generate a scaled error signal such that the scaled error signal indicates a percentage variation between the nominal VDD value and the actual VDD value; and a multiply unit coupled to the scaling unit and to the system processor to multiply the command by the scaled error signal to determine the modified command.

18. The system of claim 17 wherein the multiply unit multiplies in a single multiply and accumulate operation.

19. The system of claim 17 wherein the scaling and multiply operations are performed without a division of variables operation.

20. A disk drive system comprising:

a disk having a surface capable of storing data;

a read/write head configured to read and write data to specified locations of the disk surface;

a voice coil motor coupled to the read write head and responsive to a drive signal to position the read/write head at the specified locations;

a voltage-mode driver coupled to receive an external supply voltage VDD and generating the drive signal to the voice coil motor;

a system processor configured to generate commands indicating a programmed voltage output desired from the voltage-mode driver;

a comparator coupled to compare VDD to a reference voltage to generate an error signal;

a combination mechanism coupled to receive the error signal and the command and generate a modified command using the error signal; and a connection coupling the modified commands to the voltage-mode driver, wherein the voltage-mode driver generates a voltage output based upon the modified command.

21. A disk drive control system comprising:

a servo control unit responsive to servo control information read from the disk to output servo control signals;

a process executing in the servo control unit to update the servo control signals at a faster rate than a servo sector rate of the disk drive wherein the process receives inputs from a number of environmental variables and the updated servo control signals reflect changes in any of the number of environmental variables.

* * * * *